United States Patent [19]
Chi

[11] Patent Number: 5,918,895
[45] Date of Patent: Jul. 6, 1999

[54] HEADSET ASSEMBLY FOR A BICYCLE

[76] Inventor: Yi-Chen Chi, No. 139-5, An Mei Rd., Meishan Village, Houli Hsiang, Taichung Hsien, Taiwan

[21] Appl. No.: 09/086,217

[22] Filed: May 28, 1998

[51] Int. Cl.$^6$ ........................................................ B62K 1/00
[52] U.S. Cl. ............................................................. 280/279
[58] Field of Search ................................... 280/279, 280; 74/513, 515 E, 551.1; 384/537, 539

[56] References Cited

U.S. PATENT DOCUMENTS

| | | | |
|---|---|---|---|
| 5,454,281 | 10/1995 | Chi | 74/551.1 |
| 5,544,905 | 8/1996 | Chen | 280/279 |
| 5,823,556 | 10/1998 | Chi | 280/279 |

*Primary Examiner*—Lanna Mai
*Assistant Examiner*—Faye M. Fleming
*Attorney, Agent, or Firm*—Holland & Hart LLP

[57] ABSTRACT

A headset assembly includes a race mounted to a head tube and has a first groove defined in the inner periphery thereof, an annular flange extending inwardly and radially from the inner periphery of the race, a cap member mounted to the race and has a second groove defined in the outer periphery thereof, and an annular track connected to a periphery defining the second groove and having a third groove in the outer periphery thereof so as to hold a plurality of ball bearings between the first groove and the third groove. The annular flange is located above the annular track so as to retain the annular track in position. Accordingly, the outer periphery of the cap member does not need to be heat treated.

5 Claims, 6 Drawing Sheets

HEADSET ASSEMBLY FOR A BICYCLE

FIELD OF THE INVENTION

The present invention relates to a headset assembly, and more particularly, to an improved headset assembly which has a cap member, a race, a bearing and an annular track disposed between the bearing and the cap member so that balls are rotatably received between the track and the race. The cap member has a flange extending from an inner periphery thereof so as to retain the annular track in position so that the cap member does not need to undergo a heat treatment process.

BACKGROUND OF THE INVENTION

A conventional headset assembly is show in FIG. 5 and includes an upper part 10 mounted to the upper end of a head tube 30 through which a steerer tube (not shown) extends and a lower part 20 connected to the lower end of the head tube 30. The upper part 10 includes an upper race 11 inserted into the upper end of the head tube 30 and has a first groove 112 defined in an upper portion thereof, an upper cap 12 thread mounted to the steerer tube and has a second groove 122 defined in the lower portion thereof, and a bearing 13 received between the first groove 112 and the second groove 122. The lower part 20 has a similar structure to that of the upper part 10 and includes a lower race 21 inserted into the lower end of the head tube 30 and has a third groove 212, a lower cap 22 with a fourth groove 222, and a bearing 23 received between the third groove 212 and the fourth groove 222. The surface of the upper cap 12 has to be heat treated so as to have sufficient hardness so as to bear balls of the first bearing 13 rolling thereon. However, the upper cap 12 tends to be deformed by the process of heat treatment such that the first bearing 13 cannot operate properly and thus shortens the term of usage of the first bearing 13. Furthermore, the inner threaded portion of the upper cap can 12 be heat treated, and this could affect the shape thereof. The process of heat treatment is necessary for the upper cap 12, but it also produces many problems, such as, the deformation of the upper cap 12, a fatigue problem with the upper cap 12 and high manufacturing cost. The same problems are also found on the lower cap 22.

In addition, the bearing 13/23 includes an annular cage 132 in which a plurality of ball bearings are retained and separated so as to prevent the ball bearings from dropping from the first and the second groove 112, 122. However, because of the cage 132, the bearing assembly 13/23 typically has only 16 ball bearings in the cage 132, and this is deemed not to be enough. The bearing assembly 13/23 has a specification orientation to be used, but assemblers could set the bearing 13/23 in the wrong orientation, such as the orientation shown in FIG. 6.

The present invention intends to provide a headset for a bicycle comprising an annular member disposed between the bearing and the upper/lower race and a flange extending from the upper/lower cap member so as to retain the corresponding annular track so that the cap member does not need to be heat treated. The present invention therefore effectively mitigates and/or obviates the problems of the conventional headset assembly.

SUMMARY OF THE INVENTION

In accordance with one aspect of the present invention, there is provided a headset assembly comprising a race mounted to a head tube and having a first groove defined in an inner periphery thereof and an annular flange extending inwardly and radially from the inner periphery thereof. A cap member is mounted to the race and has a second groove defined in an outer periphery thereof. An annular track is disposed to a periphery defining the second groove and has a third groove defined in an outer periphery thereof so that a plurality of ball bearings are situated between the first groove and the third groove. The annular flange is located above the annular track so as to retain the annular track in position.

It is an object of the present invention to provide a headset assembly of a bicycle, wherein the ball bearings are situated between the annular track and the race without a cage.

It is another object of the present invention to provide a headset assembly of a bicycle, wherein the outer periphery of the cap member of the assembly does not need to be heat treated.

Further objects, advantages, and features of the present invention will become apparent from the following detailed description with appropriate reference to the accompanying drawings.

DETAILED DESCRIPTION OF THE PREFERRED EMBODIMENT

Figure 1:
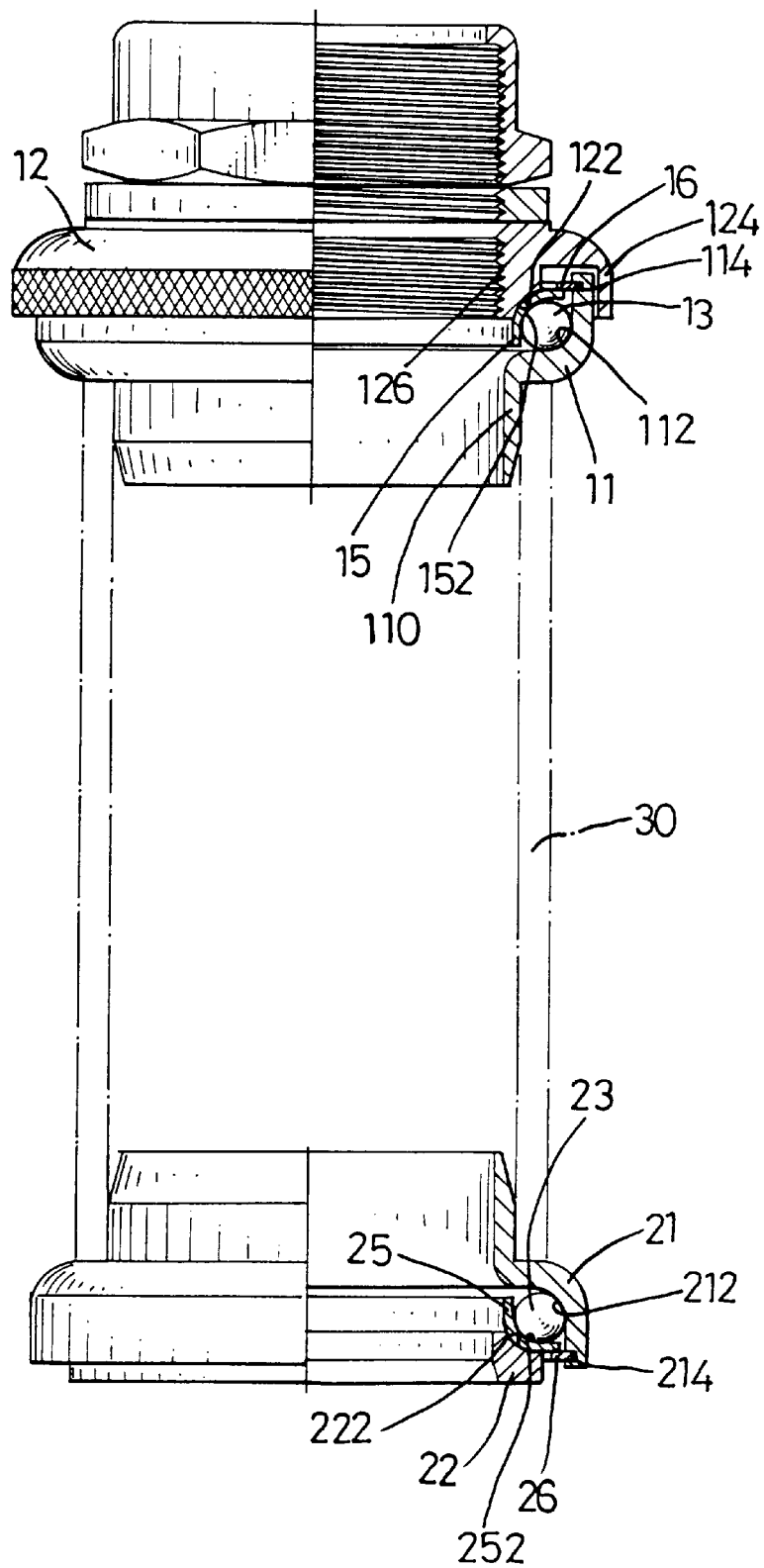
FIG. 1 is an illustrative view to show a headset assembly in accordance with the present invention, together with a head tube.
Figure 2:
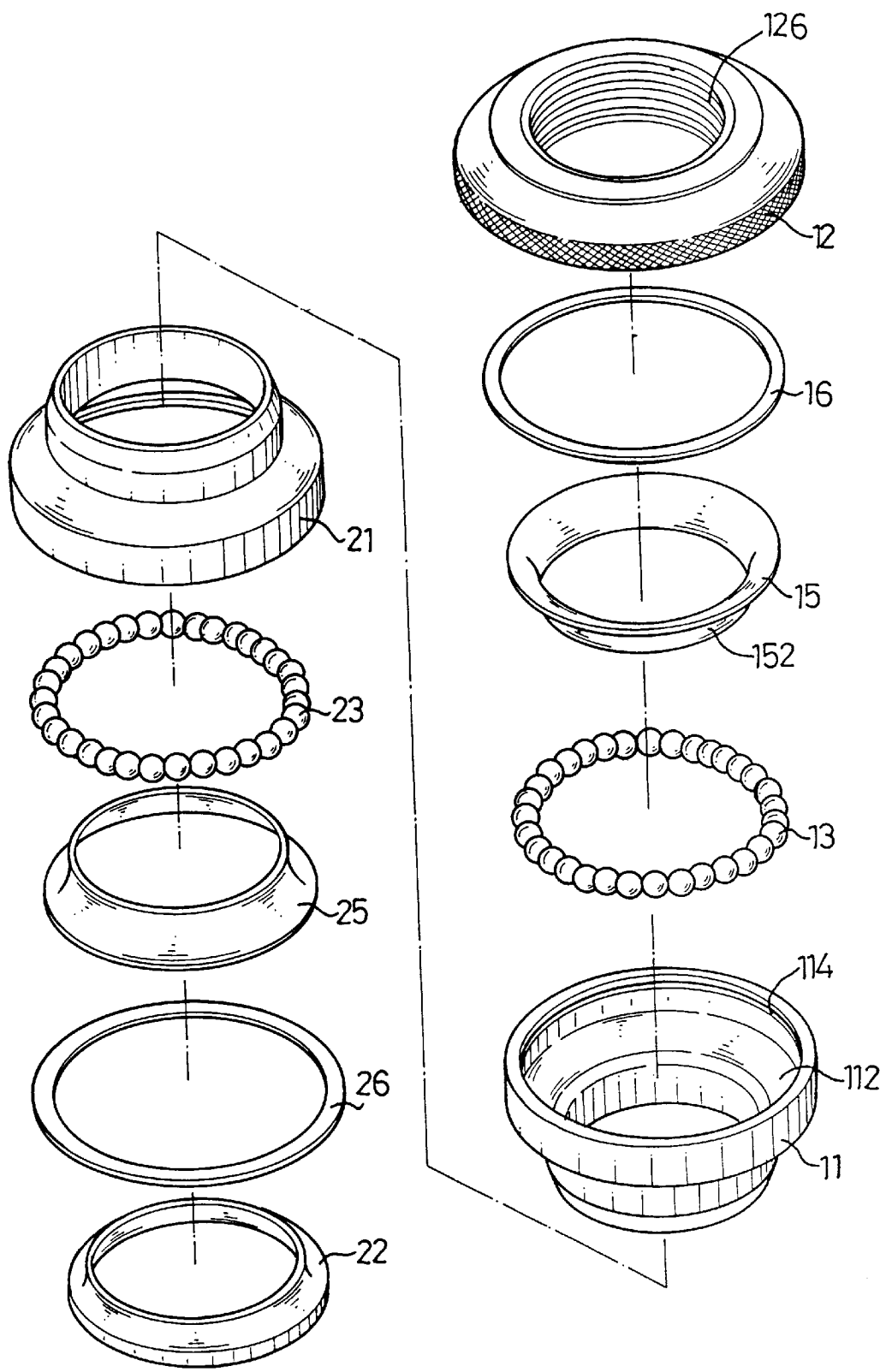
FIG. 2 is an exploded view of the headset assembly in accordance with the present invention.
Figure 3:
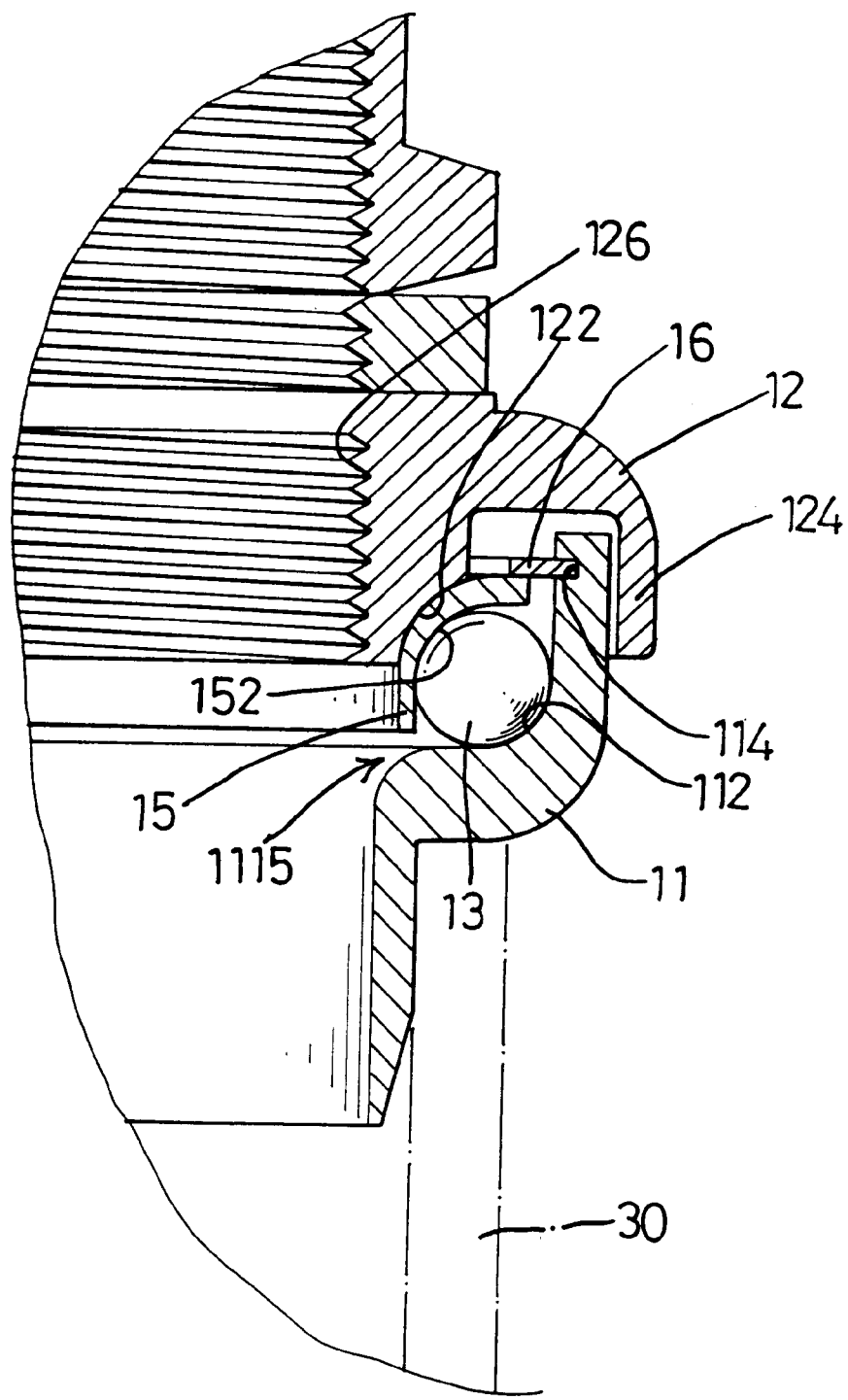
FIG. 3 is an enlarged fragmentary view, partly in section, of the upper part of the headset assembly in accordance with the present invention.

Referring to FIGS. 1 through 3, a headset assembly in accordance with the present invention includes a headset assembly with the upper part connected to the upper end of a head tube 30 and a lower part connected to the lower end of the head tube 30. The upper part of the headset assembly comprises an upper race 11 having a neck 110 inserted into the upper end of the head tube 30 and a first groove 112 defined in the inner periphery of the upper half thereof. An annular flange extends inwardly and radially from the inner periphery of the upper half of the upper race 11, wherein the annular flange is formed by inserting a ring member 16 into an annular slit 114 defined in the inner periphery of the upper race 11.

The upper cap member 12 has an inner threaded periphery 126 so as to be thread mounted to the steerer tube (not shown) which extends through the head tube 30 and the headset assembly. The cap member 12 further has a skirt portion 124 extending radially and downwardly from the body thereof so as to receive the upper periphery of the upper race 11 together with the ring member 16 between the skirt portion 124 and the body. A second groove 122 is defined in the outer periphery of the cap member 12 and faces to the first groove 112.

The annular track 15 is connected to a periphery defining the second groove 122 and has a third groove 152 defined in an outer periphery thereof and facing to the first groove 112. A plurality of ball bearings 13 are situated between the first groove 112 and the third groove 152, and the annular ring member 16 is located above the annular track 15 so as to retain the annular track 15 in position. The annular gap 1115 is defined between the peripheral edge of the annular track 15 opposite to the annular ring member 16 and the upper race 11 so that lubricant can be added to the ball bearings 13 therefrom.

Therefore, the ball bearings 13 need no cage at all because they are well retained between the annular track 15 and the upper race 11 so that the headset assembly of the present invention may have up to 26 ball bearings 13. No problem of orientation of the bearing exists because of the cageless structure. Furthermore, the periphery defining the second groove 122 of the cap member 12 does not need to be heat treated, because the ball bearings 13 are not in contact with the periphery defining the second groove 122.

Figure 4:
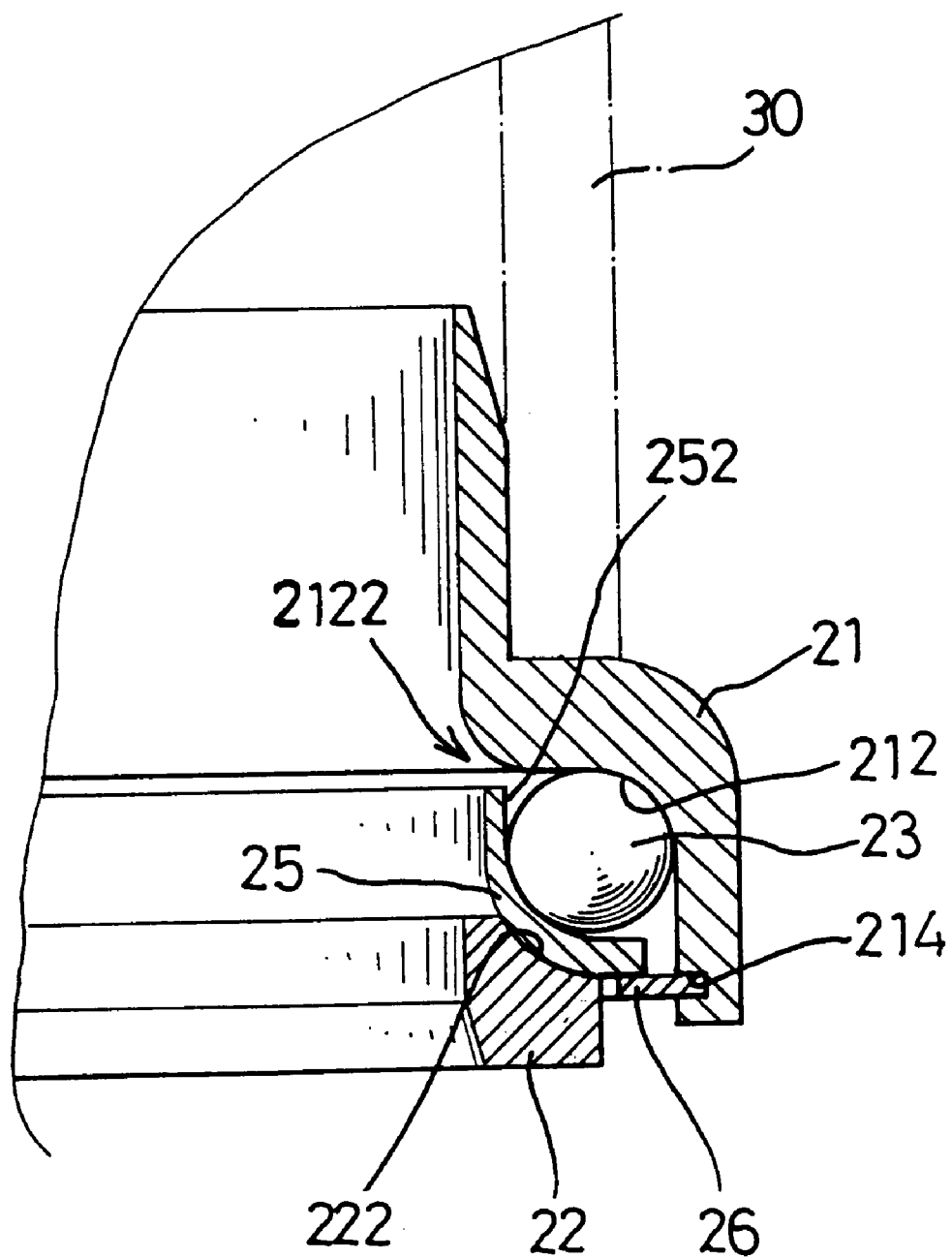
FIG. 4 is an enlarged fragmentary view, partly in section, of the lower part of the headset assembly in accordance with the present invention.
Figure 5:
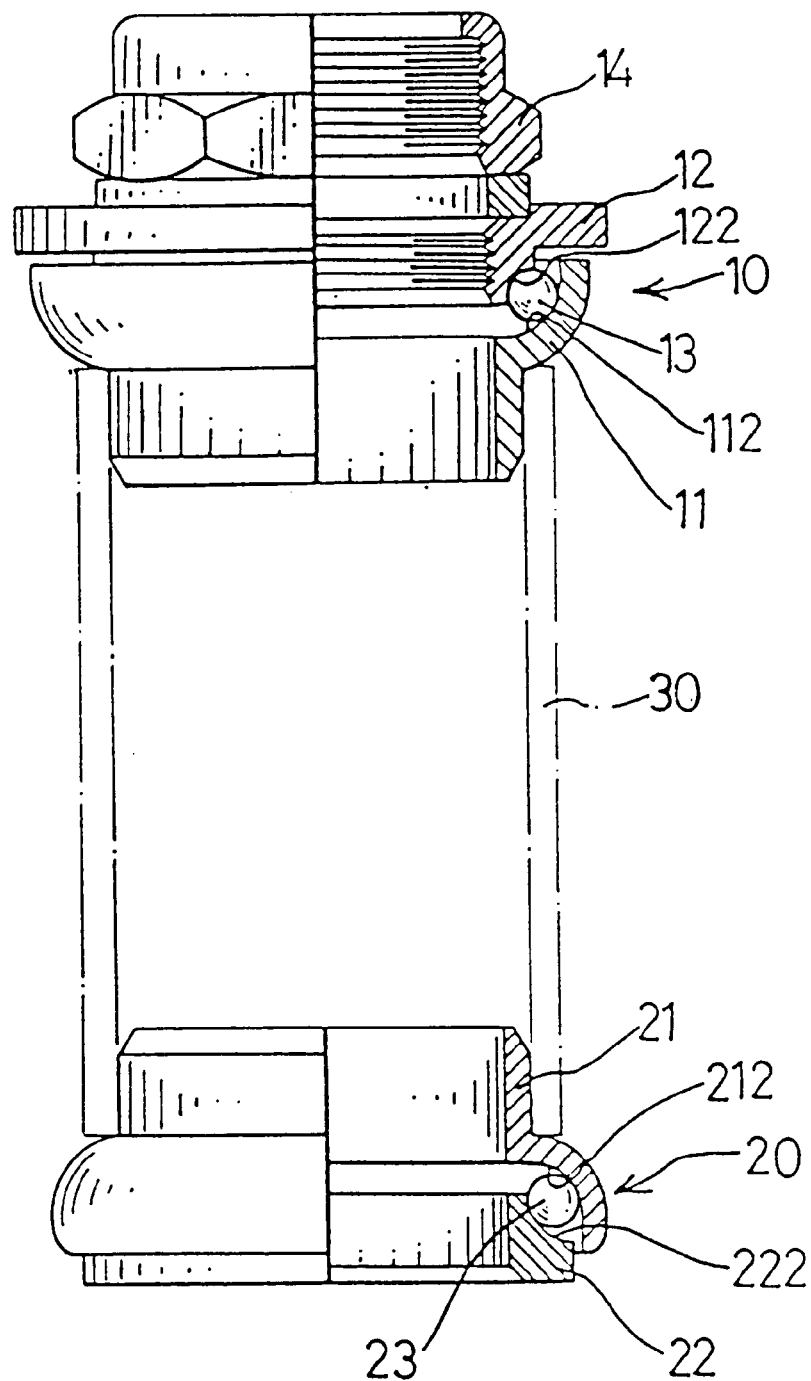
FIG. 5 is an illustrative view to show a conventional headset assembly together with a head tube.
Figure 6:
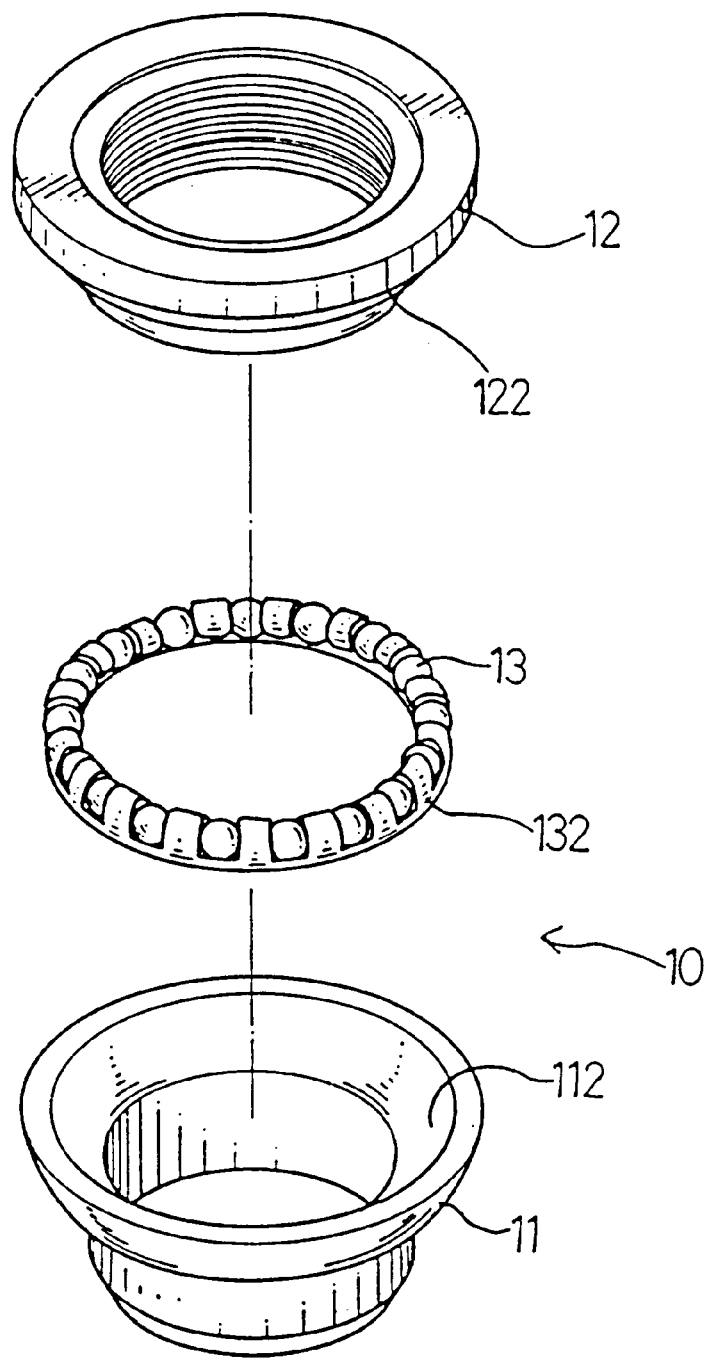
FIG. 6 is an exploded view of the conventional headset assembly with the bearing in a wrong orientation.

The lower part of the headset assembly has the same structure but in a reverse assembling direction. That is to say, referring to FIGS. 1 and 4, a lower race 21 is connected to the lower end of the head tube 30 and a cap member 22 is mounted to the lower race 21 which has an annular ring member 26 connected to it and a fourth groove 212 defined in an inner periphery thereof, wherein the annular ring member 26 is inserted into an annular slit 214 defined in the inner periphery of the lower race 21. The annular track 25 connected to a fifth groove 222 defined in an outer periphery of the cap member 22 has a sixth groove 252 defined in an outer periphery thereof so as to receive a plurality of ball bearings 23 between the fourth groove 212 and the sixth groove 252. Similarly, an annular gap 2122 is defined between the peripheral edge of the annular track 25 opposite to the annular ring member 26 and the lower race 21 so that lubricant can be added to the balls 23 therefrom.

Although the invention has been explained in relation to its preferred embodiment, it is to be understood that many other possible modifications and variations can be made without departing from the spirit and scope of the invention as hereinafter claimed.

What is claimed is:

1. A headset assembly comprising:

a race (11) adapted to be mounted to a head tube and having a first groove (112) defined in an inner periphery thereof, an annular flange (16) extending inwardly and radially from said inner periphery of said race (11);

a cap member (12) mounted to said race (11) and having a second groove (122) defined in an outer periphery thereof, and an annular track (15) disposed to a periphery defining said second groove (122) and having a third groove (152) defined in an outer periphery of said cap member thereof, a plurality of ball bearings (13) being situated between said first groove (112) and said third groove (152), said annular flange (16) located above said annular track (15) so as to retain said annular track (15) in position.

2. The headset assembly as claimed in claim 1 further comprising an annular gap (1115) defined between a peripheral edge of said annular track (15) opposite to said annular flange and said race (11).

3. The headset assembly as claimed in claim 1, wherein said annular flange (16) is formed by inserting a ring member (16) into an annular slit (114) defined in said inner periphery of said race.

4. The headset assembly as claimed in claim 1, wherein said cap member (12) has a skirt portion (124) extending radially and downwardly from a body thereof so as to receive an upper periphery of said race (11) between said skirt portion (124) and said body.

5. The headset assembly as claimed in claim 1, wherein said cap member (12) has an inner threaded periphery (126).

* * * * *